(12) United States Patent
Looser et al.

(10) Patent No.: US 11,329,529 B2
(45) Date of Patent: May 10, 2022

(54) ELECTRICAL MACHINE AND ROTOR FOR AN ELECTRICAL MACHINE

(71) Applicant: Celeroton AG, Volketswil (CH)

(72) Inventors: Andreas Looser, Zürich (CH); Manuel Blaser, Fislibach (CH); Konrad Hertig, Brugg (CH)

(73) Assignee: CELEROTON AG, Volketswil (CH)

( * ) Notice: Subject to any disclaimer, the term of this patent is extended or adjusted under 35 U.S.C. 154(b) by 351 days.

(21) Appl. No.: 16/303,995

(22) PCT Filed: May 24, 2017

(86) PCT No.: PCT/EP2017/062591
§ 371 (c)(1),
(2) Date: Nov. 21, 2018

(87) PCT Pub. No.: WO2017/202941
PCT Pub. Date: Nov. 30, 2017

(65) Prior Publication Data
US 2020/0028402 A1 Jan. 23, 2020

(30) Foreign Application Priority Data
May 25, 2016 (EP) ..................................... 16171386

(51) Int. Cl.
*H02K 5/167* (2006.01)
*F16C 17/04* (2006.01)
*H02K 5/24* (2006.01)

(52) U.S. Cl.
CPC ........... *H02K 5/1677* (2013.01); *F16C 17/04* (2013.01); *H02K 5/24* (2013.01); *F16C 2380/26* (2013.01);
(Continued)

(58) Field of Classification Search
CPC ........ H02K 5/1677; H02K 5/24; H02K 1/185; H02K 1/2726; H02K 2205/03;
(Continued)

(56) References Cited

U.S. PATENT DOCUMENTS 3,146,635 A 9/1964 Brose
3,502,920 A 3/1970 Chaboseau
(Continued)

FOREIGN PATENT DOCUMENTS

CN 1853047 10/2006
CN 102223007 10/2011
(Continued)

OTHER PUBLICATIONS

Translation of foreign document CN102223007A (Year: 2011).*
(Continued)

*Primary Examiner* — Alex W Mok
(74) *Attorney, Agent, or Firm* — Rankin, Hill & Clark LLP (57) ABSTRACT

An electrical machine includes a stator with a stator body supporting an electrical stator and a rotor. The rotor is supported by a bearing having a radial bearing section forming a radial gas bearing and an axial bearing section forming an axial gas bearing, the stator side parts of these bearing sections being a stator side radial bearing part and a stator side axial bearing part that are rigidly connected to one another and together form a stator bearing structure. The stator bearing structure is mounted to the other parts of the stator by either the stator side radial or axial bearing part being rigidly mounted to these other parts, and the other bearing part are connected to these other parts by an elastic support or not at all.

11 Claims, 8 Drawing Sheets

(52) U.S. Cl.
CPC ..... *H02K 2205/03* (2013.01); *H02K 2205/09* (2013.01)

(58) Field of Classification Search
CPC .......... H02K 2205/09; H02K 2213/09; H02K 5/128; H02K 5/161; H02K 5/165; H02K 7/083
USPC .......................................................... 310/51
See application file for complete search history.

(56) References Cited

U.S. PATENT DOCUMENTS

| | | | | |
|---|---|---|---|---|
| 6,259,179 | B1* | 7/2001 | Fukuyama | F16C 32/0451 310/90.5 |
| 7,635,937 | B2* | 12/2009 | Brunet | F16C 32/0459 310/90.5 |
| 7,834,501 | B2* | 11/2010 | Childe | F16C 27/066 310/90 |
| 8,040,007 | B2* | 10/2011 | Petrov | H02K 5/1285 310/156.27 |
| 2006/0061222 | A1 | 3/2006 | McAuliffe et al. | |
| 2006/0186750 | A1 | 8/2006 | Hosoe | |
| 2010/0019589 | A1 | 1/2010 | Saban et al. | |
| 2010/0059056 | A1* | 3/2010 | Sears | A61M 16/0066 128/204.18 |
| 2010/0320172 | A1* | 12/2010 | Neumann | B23H 7/265 219/69.13 |
| 2015/0362012 | A1* | 12/2015 | Ermilov | F16C 33/1015 384/105 |

FOREIGN PATENT DOCUMENTS

| | | |
|---|---|---|
| EP | 0 899 049 | 3/1999 |
| KR | 10-1187919 | 10/2012 |
| WO | 03/019753 | 3/2003 |
| WO | 2018/060322 | 4/2018 |

OTHER PUBLICATIONS

English translation of Chinese Office Action dated Jun. 16, 2020, Application No. 201780015997X, 7 pages.
"MMPA Standard No. 0100-00 Standard for Specifications for Permanent Magnet Materials", Jan. 1, 1964, 28 pages, Magnetic Materials Producers Association, Chicago, Illinois, USA, cited in the International Search Report.
C. Pradere et al., "Transverse and longitudinal coefficient of thermal expansion of carbon fibers at high temperatures (300-2500 K)", ScienceDirect, Carbon (2008), pp. 1874-1884, vol. 46, No. 14, Elsevier, Oxford GB, cited in the International Search Report.
English translation of International Preliminary Report on Patentability dated Nov. 27, 2018 (Nov. 27, 2018), Application No. PCT/EP2017/062591, 9 pages.

* cited by examiner

ELECTRICAL MACHINE AND ROTOR FOR AN ELECTRICAL MACHINE

BACKGROUND OF THE INVENTION

Field of the Invention

The invention relates to the field of electrical machines, in particular to high-speed electrical machines with gas bearings.

Description of Related Art

Figure 1A:
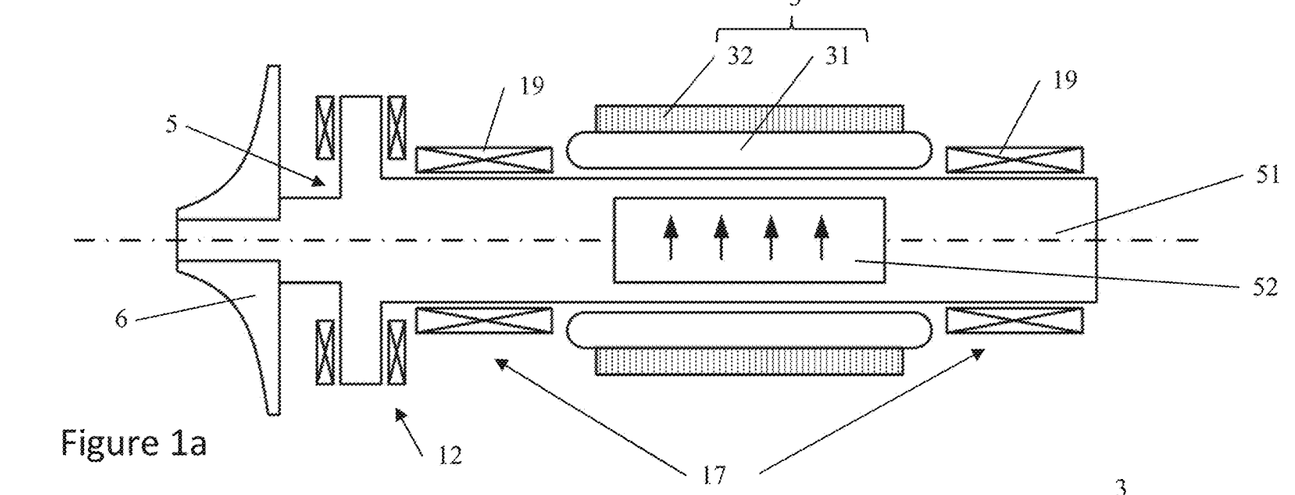
FIG. 1a-b longitudinal section views of prior art machines with gas bearings.
Figure 1B:
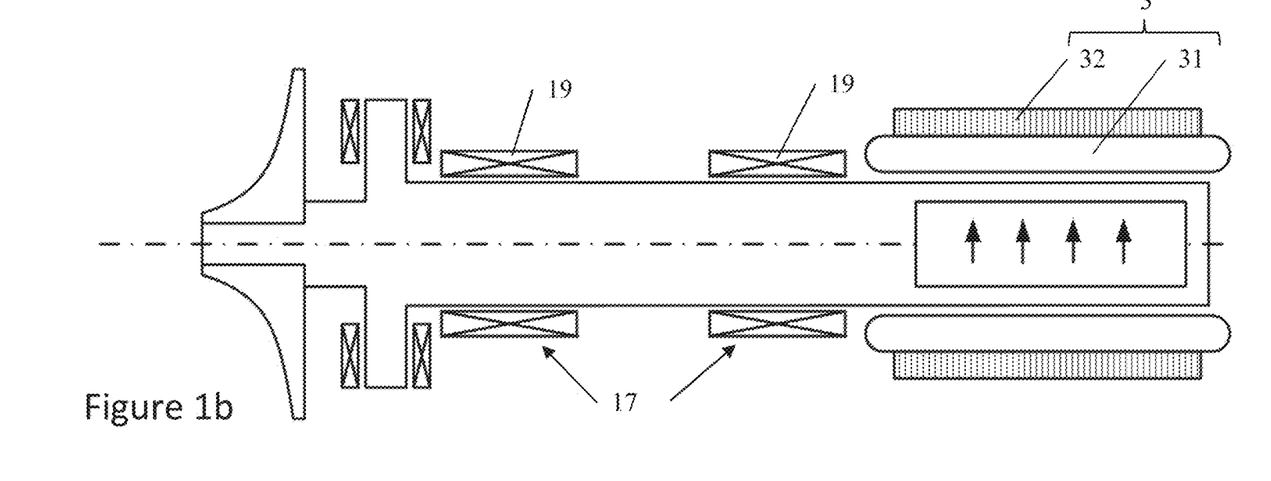

An electric motor generally includes a rotor and a stator, the stator including a stator body supporting and housing an electrical stator and bearings. The position of the bearings relative to the stator body can be defined by bearing flanges of the stator body. Often, two journal bearings are present, typically located at opposite sides of the stator, as shown in the arrangement of FIG. 1a (wherein the stator body is not shown). The precision of the alignment of the bearings in this case is mainly defined by the precision with which the bearing flange and stator body are machined. With fluid film and in particular for gas bearings, precise alignment is crucial and this arrangement in general requires special measures such as self-aligning or compliant bushing mountings, or machining, e.g. reaming, of the pair of bearings after assembly. Alternatively, the journal bearings can be arranged on the same side of the stator. This arrangement is often called overhanging motor design (FIG. 1b). With the overhanging design, the two journal bearings can be integrated into a single part, thus precise bearing alignment is easier to achieve. However, this approach generally results in longer rotors and therefore more critical dynamic behaviour of the rotor. Furthermore, windage losses, caused by air resistance, are increased, with a negative impact on the overall motor efficiency.

U.S. Pat. No. 3,502,920 discloses a slotted electrical machine with air gap bearings, in which a bushing is located in the magnetic gap between the stator and the rotor. The bushing can be elastically suspended relative to the stator. It defines on the one hand a radial bearing and can include a centrally located thrust bearing or thrust block as an axial bearing. In order to assemble the machine, the rotor needs to be separated in the axial direction. This design is unfit for high-speed motors.

WO 03/019753 A2 shows a spindle motor in which the rotor rotates in the stator within a thin layer of epoxy forming a cylindrical through bore in the stator and serving to define both a radial bearing surface and an axial bearing surface. The thin layer of epoxy is directly coupled to the stator housing, and any thermally induced deformations of the housing will immediately affect the geometry of the bearing.

US 2006/0061222 A1 and US 2006/0186750 A1 show conventional air bearings.

US 2010/0019589 A1 discloses a slot configuration of an electrical machine, and, inter alia, a rotor having a multi-layer fiber-reinforced composite sleeve wrapping. Layers can be cosmetic or have functional characteristics, e.g. for achieving strength and rigidity and controlling thermal expansion in one or multiple directions. This can be done by having fibres in a particular layer oriented axially, thereby providing axial strength and limiting axial thermal expansion. In another layer, fibers can be oriented circumferentially, thereby providing circumferential strength and limiting radial thermal expansion. Thus, these layers are configured to stiffen the rotor. They would not be suited to carry an outer sleeve of a relatively stiff material required by a gas bearing, since their purpose is to control expansion, i.e. limit, thermal expansion of the rotor, rather than absorbing differences in thermal expansion between a hard rotor core and a hard rotor sleeve.

There is a need for an electrical machine that is suited for high-speed applications and that overcomes the abovementioned disadvantages at least in part.

Mainly with gas bearings, the bearing member's materials are chosen to have high rigidity and a low coefficient of thermal expansion, in order to ensure well-defined bearing clearances under the various operating and environmental conditions of the motor. The high rigidity of the materials however also causes the disadvantage of high stresses in the material at already low strain, e.g., when combining these materials with other materials having a higher coefficient of thermal expansion.

There is a need for a rotor that is suited for high-speed electrical machines that overcomes the abovementioned disadvantages at least in part.

SUMMARY OF THE INVENTION

It is therefore an object of the invention to create an electrical machine of the type mentioned initially, which overcomes the disadvantages mentioned above.

It is therefore an object of the invention to create a rotor for a high-speed electrical machine of the type mentioned initially, which overcomes the disadvantages mentioned above.

According to a first aspect of the invention, the electrical machine includes a stator with a stator body supporting an electrical stator and a rotor. The rotor is supported by a bearing including a radial bearing section forming a radial gas bearing and an axial bearing section forming an axial gas bearing, the stator side parts of these bearing sections being a stator side radial bearing part and a stator side axial bearing part that are rigidly connected to one another and together form a stator bearing structure.

Therein, the stator bearing structure is mounted to the other parts of the stator by
  either the stator side radial bearing part being rigidly mounted to these other parts, and the stator side axial bearing part being connected to these other parts by an elastic support or not at all;
  or the stator side axial bearing part being rigidly mounted to these other parts, and the stator side radial bearing part being connected to these other parts by an elastic support or not at all.

The abovementioned "other parts" can thus be the stator body itself or an assembly that includes the electrical stator and a carrier, with the assembly being elastically supported by the stator body.

Here and throughout this document, the terms "rigidly" and "fixed" are used as opposed to "elastically". An elastic connection has a spring rate or a Young's modulus that is at least, for example, 100 or 10,000 or 1,000,000 times larger than in a rigid connection.

A rigid connection is a connection designed such that the connected parts do not move relative to one another during normal operation of the machine. Thus, a rigid connection can be established by screwing parts together or by pressing them against one another with a spring. In this case, the spring is not part of the rigid connection but provides a force that maintains rigidity of the connection.

An elastic support can be an O-ring, typically of a (synthetic) rubber, or a metallic spring.

The gas of the gas bearing can be any gas the machine operates in, such as air, a cooling agent, natural gas etc. The gas bearing can be a passive or an active gas bearing.

In embodiments, the stator bearing structure extends in the axial direction of the electrical machine from a first end to a second end, and the stator bearing structure is rigidly supported by the other parts of the stator near one of the two ends and near the other end is supported elastically or not at all.

In embodiments, the stator bearing structure is attached near one end to the stator body in a fixed manner, in particular the stator side axial bearing part is an axial bearing assembly which is rigidly mounted or attached to the stator body.

In embodiments, the stator side radial bearing part is a bushing that is rigidly mounted to the stator body or to a carrier carrying the electrical stator.

The radial bearing part extends, in the axial direction of the machine, throughout the length of the electrical stator. It can be a single part including bearing elements.

The drawbacks of long rotors can thus be avoided by having the bushing with the journal bearings arranged within the electric stator, therewith allowing short rotor designs. The journal bearings can be integrated into a single part, thus precise alignment can be easier to achieve than with journal bearings on separate parts.

The end-to-end journal bearing bushing part can increase the magnetic air gap of the motor and therefore have a negative impact on the motor efficiency. Although the end-to-end bushing concept is conceivable for a variety of machine types, slotless permanent magnet machines types are favoured for this bearing concept: due to the already relatively large magnetic air gap in slotless type permanent magnet machines, the efficiency is not seriously affected.

The bushing can be made of a ceramic material or another material that provides sufficient mechanical stiffness and does not affect the magnetic field in the magnetic air gap. The advantage of ceramic materials is that they are suited both for gas bearings and can be placed in the magnetic air gap, where they are penetrated by the torque generating magnetic field. Generally, electrical insulators or materials with low thermal conductivity such as ceramics, glass ceramics or technical glasses, plastics, composites, mineral materials etc. can be used to avoid excessive eddy current losses caused by the alternating magnetic air gap field.

In embodiments, the electrical machine is of the slotless type. In other words, the electrical stator includes an air gap winding rather than slotted windings. This is advantageous since it allows for a magnetic air gap that can accommodate elements of an air bearing, such as a bushing, without substantial disadvantages.

In embodiments, the radial bearing section extends in the longitudinal direction of the axis of rotation and all bearing elements and cooperating rotor bearing surfaces of the radial bearing section lie outside the magnetic gap between the electrical stator an the rotor.

In embodiments, the radial bearing section extends in the longitudinal direction of the axis of rotation and the entirety of the radial bearing section lies in the magnetic gap between the electrical stator an the rotor.

In embodiments, the radial bearing section extends in the longitudinal direction of the axis of rotation and at least one bearing element and cooperating rotor bearing surface of the radial bearing section lie in the magnetic gap between the electrical stator and the rotor.

In embodiments, the radial bearing section extends in the longitudinal direction of the axis of rotation and at least one quarter, or at least one half, or at least three quarters of the radial bearing section lie in the magnetic gap between the electrical stator an the rotor.

A thrust bearing or axial bearing typically includes a rotor disc in the rotor and, at each side of the rotor disc, as seen in the axial direction, an adjacent stator disc on the stator. The two stator discs are separated by a shim or spacer element such that a well-defined gap is formed between the rotating and stationary parts of the thrust bearing. Together, stator discs, spacer and connecting elements form the axial bearing assembly.

In embodiments, the stator disc of the axial bearing assembly and the bushing each include an axially facing surface as an axial reference surface and the two axial reference surfaces are placed against one another. Thereby they ensure that the axis of rotation is normal to bearing surfaces of the axial bearing assembly.

In embodiments, a stator disc of the axial bearing assembly and the bushing are manufactured as a single piece or part.

In embodiments, the stator disc and the bushing that are placed against one another are pressed against one another by a resilient element. The resilient element can be as an axial compensation element, which can be a metal spring or synthetic part such as an O-ring.

As a result, during assembly the relative axial position and the angle between the stator disc and the bushing is well defined by the reference surfaces, whereas the relative position in the radial direction is not defined. This allows assembling the parts without mechanical constraints that might lead to a deformation of the parts. After assembly, by being pressed against each other the parts are rigidly connected.

For best orthogonality of journal and thrust bearings, the connecting surface on the bushing part is manufactured precisely orthogonal to the journal bearing rotational axis and the stator thrust disc faces are manufactured highly parallel. The axial bearing thrust discs together with the thrust bearing shim or spacer can be rigidly mounted to the stator body, e.g. by means of screws. Using the spring element (which can simply be an O-ring) between the stator body and the journal bearing bushing part, the bushing is orthogonally self-aligned to the axial bearing disc/shim stack or axial bearing assembly. This mounting concept is well defined, that is, not over-determined. Thus the stator body or its parts can thermally deform in a wide range without impact on the alignment or deformation of the bearing system.

In embodiments, two stator discs and a spacer element arranged between the two stator discs are pressed against one another by a resilient element. This resilient element can be the same one as the one that presses a stator disc against the bushing. There also can be two resilient elements for pressing the two stator discs, the spacer element and the bushing against one another. This allows for simpler assembly and, because the system is not statically overdetermined, better precision with regard to axial alignment.

In embodiments, the stator bearing structure at an end at which it is not rigidly mounted is supported by means of a first elastic support.

Such an additional elastic support on the bushing's other end allows to compensate for a possible deformation of the stator parts and to improve vibration characteristics.

In embodiments, the stator bearing structure is thermally coupled to the stator body at or near the location of the first elastic support.

Such a thermal coupling of the bushing to the stator can be effected by using O-rings both as flexible supporting elements and for sealing off a thermally conductive paste or fluid placed in between the O-rings. The paste or fluid, depending on its viscosity, can have a dampening effect, as in a squeeze film damper.

In embodiments, a carrier supporting the electrical stator is mechanically decoupled from the stator body by means of elastic carrier support elements. This allows to dampen or eliminate the transmission of vibration between the electrical stator and the stator body.

According to a second aspect of the invention, which in principle is independent from the first aspect but can be realised in combination with the first aspect, a rotor for a high-speed electrical machine is provided. The rotor includes a rotor shaft, the shaft including a rotor core and a rotor sleeve, an (essentially cylindrical) compensation element being arranged between the rotor core and the rotor sleeve to absorb differences in thermal expansion of the rotor core and the rotor sleeve.

In embodiments, the rotor sleeve, on which part also the rotating bearing surfaces are located, is made of a ceramic material, typically with a low coefficient of thermal expansion. For a permanent magnet machine, a permanent magnet can be mounted into the ceramic rotor sleeve. In general, permanent magnet materials have higher coefficients of thermal expansion than the targeted rotor sleeve materials, thus creating thermally induced stresses in the ceramic material when directly mounted or glued with a rigid adhesive.

For example, the coefficient of thermal expansion (CTE) of Samarium-Cobalt Magnets is 9 to 13 $\mu$m/m/K, that of Neodymium-Iron-Boron magnets is −1 to 8 $\mu$m/m/K. Both materials are anisotropic, but the compensation element absorbs corresponding strains as well. CTEs of typical ceramic materials for the rotor sleeve are around the range of 1.5 to 5 $\mu$m/m/K.

At high rotational speeds further stresses induced by centrifugal forces are superimposed over the thermally induced stresses.

The term "high speed electrical machine" is taken to cover machines that are suited for more than 100'000 revolutions per minute.

Generally it can be the case for all embodiments that the rotor sleeve is stiffer than the compensation element. The rotor sleeve can be stiffer than the compensation element with respect to a radial pressure, and in particular wherein a radial expansion of the rotor sleeve with regard to a radial pressure is at least less than half, or less than a fifth, or less than a tenth of a radial compression of the compensation element with regard to the same radial pressure. In the assembled state, a radial pressure acting between the compensation element and the rotor sleeve acts as a compressive pressure on the compensation element and as an expansive pressure on the rotor sleeve.

For thermally insensitive motor designs or for permanent magnets and ceramic rotor sleeves with similar coefficients of thermal expansions, the permanent magnet can be mounted into the ceramic sleeve with a tight fit or be glued in. Thermal strain of the magnet is then directly transferred to the ceramic sleeve, thereby limiting the maximum operating temperature and maximum speed. In thermally more critical designs and/or at higher speeds, a mechanical decoupling of the two parts is needed.

The rotor core can include the permanent magnet fitted in a sheath in order to improve its mechanical stability. In other embodiments, the magnetic core includes a permanent magnet which that is self-supporting, in that it does not require a sheath to maintain its stability. Ideally, the sheath should be of a material with a similar CTE than the permanent magnet but with greater mechanical stability or toughness.

In embodiments, the compensation element includes compensation sections arranged to be deformed, in particular to yield or to be bent, when the rotor expands or contracts due to temperature changes.

This compensation element or compensator, can be a metallic sleeve (e.g. made from titanium), with much higher elasticity than the ceramic materials is arranged between the rotor core (permanent magnet with or without a sheath) and rotor sleeve. The compensator is designed to absorb thermally induced strain between the rotor core and the ceramic rotor sleeve and thus reduce stresses in the ceramic material. The compensator contacts the rotor core at least at the regions of their axial ends, and in other regions establishes an air gap between the rotor core and the ceramic sleeve. In these regions, the rotor core and the compensator are allowed to shrink and expand without having an impact on the ceramic sleeve. At the rotor core's axial ends, the connection to the ceramic sleeve can be made with a well-defined distance between contact areas joining the rotor core to the compensator, and contact areas joining the compensator to the ceramic sleeve, along which the induced strain is relieved.

In an embodiment, when no preloading of the rotor core is needed, i.e. when the rotor core or just a permanent magnet constituting the rotor core is self-supporting, then the compensator can include additional points of support between the rotor core and the ceramic sleeve, or support sections of the compensation element. This can improve the dynamic behaviour of the rotor. With a well-defined axial distance between these points of support, along which the induced strain can be relieved, the compensator contacts the ceramic sleeve with an air gap towards the magnet, such that the magnet can shrink and expand freely without a noticeable impact on the ceramic sleeve.

Thus, in embodiments, the compensation element includes first sections in contact with only the rotor core and not the rotor sleeve, and second sections in contact with only the rotor sleeve and not the rotor core, and compensating sections linking the first and second sections.

The second sections can include at least one flange at an end of the compensation element, at which the compensation element has an enlarged diameter. At the other end there can be another flange. In the remaining first sections the compensation element can form a tight fit with the rotor core. The compensation element can be a metal and/or have at least approximately the same CTE as the rotor core.

In embodiments, the second sections include one or more support sections at one or more locations between second sections that are located at ends of the compensation element.

In embodiments, the second sections include a plurality of separate support sections. The separate support sections are separated by hollow spaces that can include air, a gas or another substance that is more compressible than the support sections. The separate support sections can be distributed along the length and around the circumference of the rotor core. Separate support sections can be ring-like, extending around the circumference of the rotor core, or linear, extending parallel to the axis, or running along the rotor core in a helicoidal pattern. Separate support section can be point-like, with support sections spaced from one another in the axial and the circumferential direction.

In embodiments, for each point in a compensating section, a line in the radial direction passes through a hollow space before reaching the rotor sleeve and also passes through a hollow space before reaching the rotor core. With this, the compensating sections can act as levers (when seen in a longitudinal and/or transverse cross section), being elastically bent when absorbing differences in thermal expansion of the rotor core and the rotor sleeve.

In embodiments, the compensating sections extend along at least one of the axial direction of the rotor and the circumferential direction of the rotor. This allows them to bend or yield in the radial direction.

Those second sections where the compensation element is attached to the rotor sleeve are preferably concentrated in one region as seen in the axial direction. In this manner rotor sleeve and compensation element at the remaining second sections are free to slide relative to one another in the axial direction. For example, if there are two flanges, one each at one of the two ends of the rotor, the sleeve is attached to one flange and is free to slide in the axial direction on the other flange and on any optional remaining second sections.

The same kind of distribution of attached and not attached sections can be realized for the first sections where the compensation element and the rotor core are in contact.

In embodiments, the compensation element is configured to be elongated in the axial direction, thereby reducing its outer diameter from being larger than an inner diameter of the rotor sleeve to being smaller than the inner diameter of the rotor sleeve. This allows the rotor sleeve to be assembled around the compensation element. This allows assembling the shaft by a method including the following steps:

sliding the compensation element over the rotor core;
applying a force for elongating the compensation element in the axial direction, thereby reducing its outer diameter until the outer diameter is smaller than the inner diameter of the rotor sleeve;
sliding the rotor sleeve over the compensation element;
reducing the force elongating the compensation element, thereby increasing the outer diameter of the compensation element such that it pushes against the inner surface of the rotor sleeve, thereby centering the rotor sleeve on the compensation element.

The last step also establishes a force fit between the compensation element and the rotor sleeve.

The force for elongating the compensation element can be applied by means that are not part of the rotor or shaft and are removed after assembly. Alternatively, the force can be applied and optionally also controlled by elements that are part of the rotor or shaft when it is in operation.

In embodiments, the compensation element has the shape of a corrugated cylinder.

In embodiments, hollow spaces are formed between the compensation element and the rotor core, and/or between the compensation element and the rotor sleeve, and optionally the hollow spaces are ventilated by ventilation openings, the ventilation openings being, for example, holes in the compensation element.

This ensures that, when the motor is to be used in an environment with an explosive gas, air (containing oxygen and posing a risk when mixed with the explosive gas during operation of the motor) can be flushed out before the motor is taken into operation.

For high rotational speeds it is also possible to implement the contact between the rotor core and the compensator as a shrink fit. This allows to preload the rotor core material and compensate for stresses in the rotor core caused by centrifugal forces.

Instead of using a compensator in the form of a compensation sleeve to relieve the induced strains, a strain tolerant adhesive or molding material can be used. The clearance between rotor core and ceramic sleeve is filled with a material that compensates for the different strains of magnet and ceramic sleeve. The elasticity of the adhesive or molding material is chosen to be low enough to yield to strain differences of rotor core and ceramic sleeve, but still high enough in order to prevent mechanical resonance between the rotor core and the ceramic sleeve which could be excited by the rotational frequency. The compensation material can be silicone.

Regarding Young's modulus, achievable operating temperature and durability, filled silicone molds are suitable materials for the compensation material serving as a buffer between the magnet and the ceramic sleeve.

Thus, in embodiments, the compensation element includes a synthetic elastic compensation material, and in particular the compensation material can include a filler material for adjusting its Young's Modulus.

However, silicones have the drawback of being nearly incompressible (i.e. their Poisson ratio is close to 0.5). Therefore high pressure is generated in the silicone between the magnet and the ceramic sleeve when the silicone expands at higher temperatures. Different measures can be taken to avoid this problem.

One approach is to include gas bubbles in the silicone which yields the compound a more compressible behavior. The resulting (filled) silicone foam may contain less than 1% or less than 10% or less than 30% of gas bubbles. To high gas content however will lower the overall elastic modulus of the compound such that rotordynamics is impaired. A preferred method to fabricate such a rotor is to mold the magnet into the ceramic sleeve using a filled silicone mold in combination with a foaming additive to control the gas content in the resulting compound. Another method would be to coat the magnet first with the silicone and then shrink or press it into the ceramic sleeves.

Instead of tiny gas bubbles, the problem of low compressibility and high stresses in the ceramic rotor sleeve can be solved by a patterned or structured silicon layer containing 1% to 50% of empty space. As an example, the silicon layer can contain axial, ring or spiral shaped grooves, circular cutouts or be coated in lines, circles or arbitrary shaped spots. When the magnet and silicon layer expands with higher temperature, the silicone is allowed to expand into the nearby grooves rather than build up pressure against the ceramic sleeve and produce tensile stresses. The ratio of pattern width to layer thickness is in the range of 5:1 to 20:1. Thickness is typically $1/10$ mm to $5/10$ mm. Preferably, the silicone layer/structure is brought on the permanent magnet first and then the silicone coated magnet is shrunk or pressed into the ceramic sleeve.

Another option is to first apply a (filled) silicone coating on the permanent magnet and then roughen the coating's surface to bring in some empty space where the material is allowed to expand under increased temperature.

Thus, in embodiments, between the rotor core and the rotor sleeve, and adjacent to or enclosed by the compensation material, pockets of gas are present, increasing the compressibility of the compensation material.

Such pockets of gas can be formed by one or more of the following measures:
- by gas bubbles within the compensation material, or
- by grooves in the inner and/or outer surface of the compensation material, or
- by roughening of the inner and/or outer surface of the compensation material, or
- by arranging the compensation material at disjoint locations between the rotor core and the rotor sleeve.

In embodiments, the gas bubbles are formed by expandable hollow microspheres, in particular thermoplastic expandable hollow microspheres. These can be thermally expandable.

In embodiments, a nominal diameter of the microspheres, when expanded, is larger than a nominal distance between the rotor core and the rotor sleeve. In other words, this nominal diameter is larger than the difference between the outer radius of the rotor core and the inner radius of the rotor sleeve. The rotor sleeve can be assembled on the rotor core by the steps of
- arranging the rotor core inside the rotor sleeve;
- filling the gap between them with the compensation material including the microspheres; and
- causing the microspheres to expand (e.g., by thermal activation) to their nominal diameter.

The last step causes the rotor sleeve to be centered on the rotor core, since all microspheres expand to the same nominal diameter, at least on average.

In other embodiments, the expandable hollow microspheres have a nominal diameter, when expanded, that is smaller than the above nominal distance. Then a particular microsphere does not touch both the rotor core and sleeve.

In embodiments, the compensation element includes compensation spheres of an elastic material, arranged and thereby elastically deformed between the rotor core and the rotor sleeve. The rotor sleeve can be assembled on the rotor core by the step of:
- sliding the rotor core inside the rotor sleeve while inserting the compensation spheres in the gap between them; and
- thereby elastically compressing the compensation spheres.

This causes the rotor sleeve to be centered on the rotor core, assuming that all compensation spheres have the same diameter, at least on average.

In embodiments, the compensation element includes a plurality of elastic elements attached to the rotor core and deformable by sliding the rotor sleeve over the rotor core with the elastic elements, thereby aligning and centering the rotor sleeve with respect to the rotor core.

BRIEF DESCRIPTION OF THE DRAWINGS

The subject matter of the invention will be explained in more detail in the following text with reference to exemplary embodiments which are illustrated in the attached drawings, which show:

FIGS. 6a-7g partial longitudinal sections of rotors of a first group of embodiments;

FIG. 7h a transverse section of a rotor of the first group;

In principle, identical parts or parts with an analogue function are provided with the same reference symbols in the figures.

DESCRIPTION OF RELATED ART

FIG. 1a schematically shows a prior art electrical machine with air or gas bearings. Therein, a stator body (not shown) carries an electrical stator 3 with a coil 31 and a core 32 and further carries an axial bearing section 12 and a radial bearing section 17 in which a rotor 5 with a shaft 51 and a permanent magnet 52 is arranged to rotate. Individual bearing elements 19 constituting the radial bearing section 17 are arranged at opposite ends of the machine, with the electrical stator 3 in between. FIG. 1a shows the same elements in a prior art overhanging arrangement, with the individual bearing elements 19 arranged at the same end of the machine, both at the same side of the electrical stator 3.

Here and in the other arrangements, a fan 6 driven by the electrical machine operating as a motor is shown as an example for an application of the machine. Naturally, any other end device, in particular one requiring a high speed drive can arranged to be driven by the electrical machine.

Figure 2A:
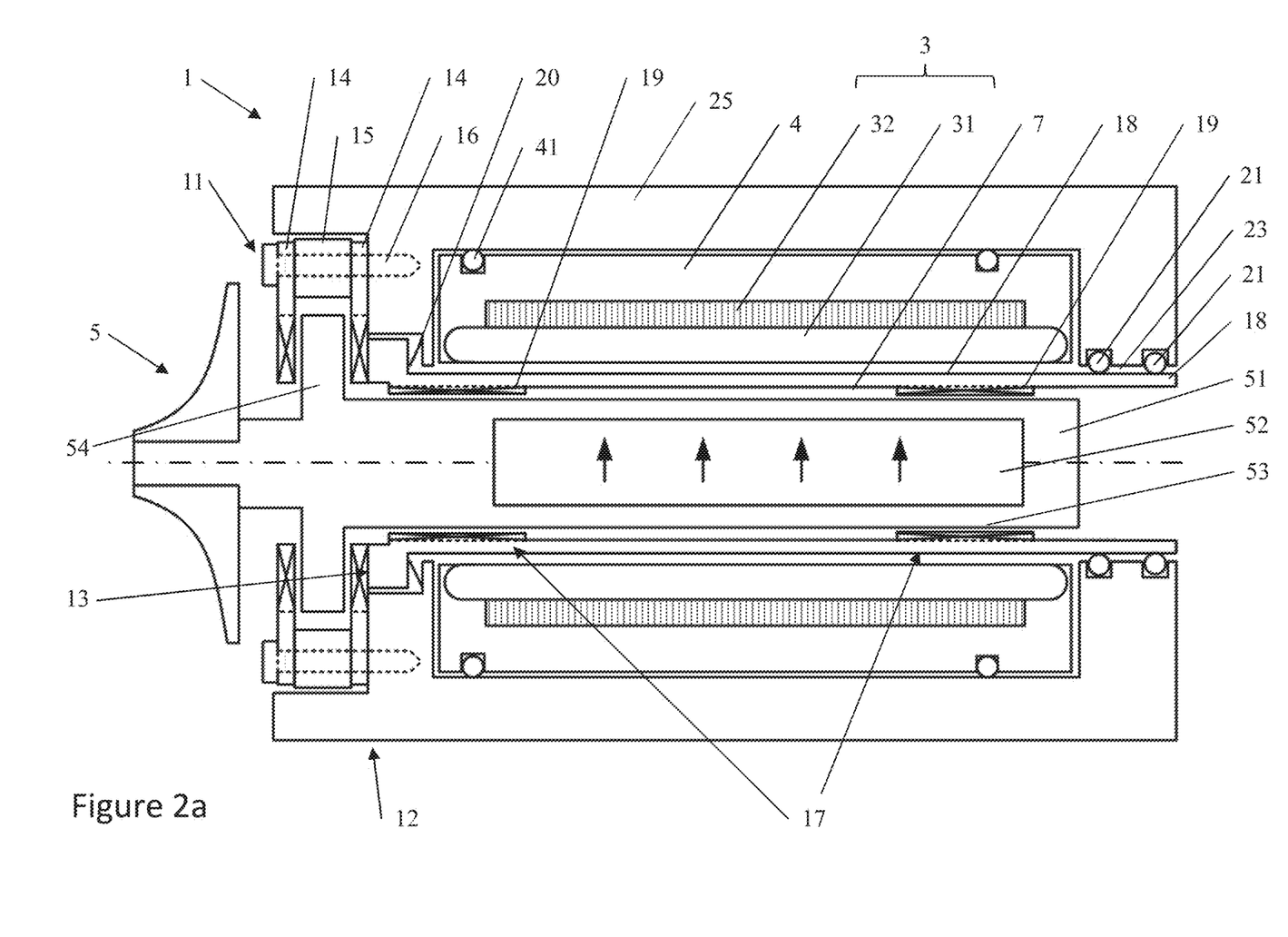
FIGS. 2a-c a first embodiment of an electrical machine, with variations.

FIG. 2a schematically shows a first embodiment, with the elements already mentioned, but in a different arrangement. In addition, the stator 1 is shown, including a stator body 25 supporting a carrier 4 elastically by means of elastic carrier supports 41 such as O-rings. The elastic carrier supports 41 serve to decouple the stator body 25 and the carrier 4 with respect to thermal distortion. Alternatively, the carrier 4 can be rigidly attached to the stator body 25, or the two can be one and the same part. The carrier 4 carries the electrical stator 3. The stator body 25 can be the housing of the machine or just part of it.

The parts of the axial bearing section 12 and the radial bearing section 17 that are attached to the stator as opposed to the rotor form a stator bearing structure. This stator bearing structure includes the stator-side bearing surfaces of the axial bearing section 12 and the radial bearing section 17 and defines the relative position of these surfaces. The stator bearing structure is designed to be rigid in itself and to be easily and reliably machined and assembled to high precision.

The axial bearing section 12 or thrust bearing section on the part of the rotor includes a generally disk-like thrust plate or rotor disc 54 extending outwardly from an outer peripheral surface of the shaft 51 near one end of the rotor 5. The rotor disc 54 has two oppositely facing axially facing surfaces, which in cooperation with two stator discs 14, between which the rotor disc 54 is arranged to rotate, form the axial bearing.

The axial bearing section 12 on the part of the stator includes these stator discs 14, which are part of an axial bearing assembly 11, which further includes a spacer element 15, typically a washer, which defines a distance between axially facing surfaces of the of the stator discs 14 facing each other, and fasteners 16 that clamp the stator discs 14 and spacer element 15 together. The same fasteners 16 can also attach the axial bearing assembly 11 to the stator body 25.

The radial bearing section 17 or journal bearing section on the part of the rotor includes at least part of the outer peripheral surface of the shaft 51. This part functions as a rotor bearing surface 53, which in cooperation with bearing elements 19 of a bushing 18 form the radial bearing.

The radial bearing section 17 on the part of the stator includes this bushing 18.

In order to align the axis of rotation, which is defined by the bearing surfaces of the bushing's bearing elements 19 of the radial bearing section 17, to be orthogonal to the bearing surfaces of the axial bearing section 12, only a single pair of surfaces needs to be machined with high precision and mounted against one another: These are axial reference surfaces 13 located on an inner one of the stator discs 14 and on an axially facing surface of the bushing 18. These axial reference surfaces 13 are machined to define a right angle between the axially facing bearing surfaces of the axial bearing section 12 and the axis of rotation.

The axial reference surface 13 of one (inner) stator disc 14 and the bushing 18 can be attached to each other by various means of fastening, including further fastening elements or welding, gluing etc. Alternatively, as shown in FIG. 2, they can be placed against one another without being directly attached, but rather being pressed against one another by an axial compensation element 20, such as a plate spring (conical spring washer) or spring washer or an O-ring, arranged to press the bushing 18, in particular a shoulder or flange of the bushing, in the axial direction away from the stator body 25 and against the stator disc 14. The stator disc 14 in turn is held against the stator body 25 by the fastener 16 in a fixed manner.

Figure 2B:
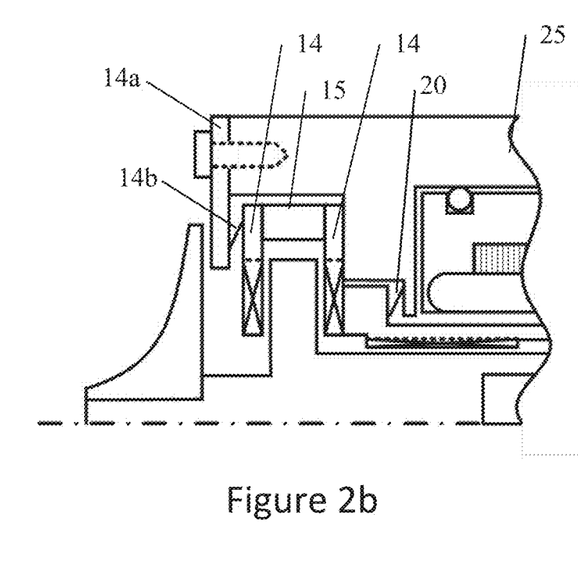

Alternatively, as shown in FIG. 2b, the stator discs 14 and the spacer element 15 can be clamped together by means of a mounting disc 14a and a plate spring 14b (or O-ring which acts as spring element). The plate spring 14b clamps the stator discs 14 against the stator body 25 and also must compensate the clamping force of the axial compensation element 20. Thus, the plate spring 14b must be preloaded more than the axial compensation element 20 and is therefore generally larger and stiffer.

Figure 2C:
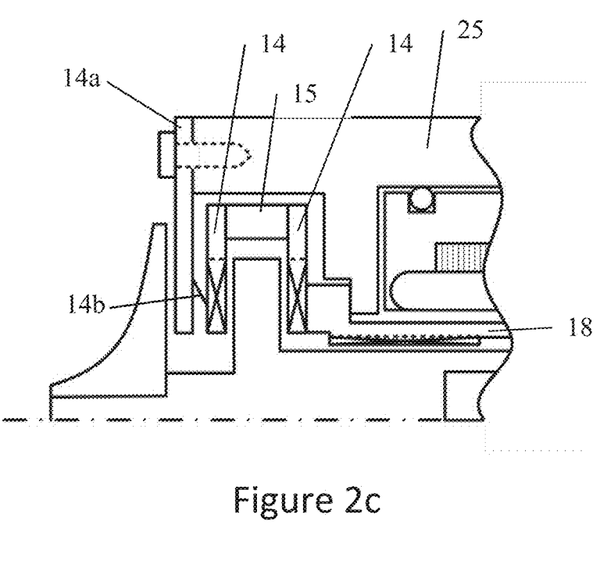

Another alternative is shown in FIG. 2c. The stator discs 14, the spacer element 15 and the shoulder of the bushing 18 are clamped against the stator body 25. For robustness against possible tilting of the stator discs 14 relative to the bushing 18, the diameter where the plate spring 14b is in contact with the (outer) stator disc 14 can be smaller than an outer diameter of the bushing 18, in particular of a shoulder of the bushing 18 that abuts the other (inner) stator disc 14.

At its other end, with respect to the axial bearing section 12, the bushing 18 is supported by the stator body 25 by first elastic supports 21, for example, O-rings. This dampens mechanical oscillations that might arise at the otherwise free end of the bushing 18. A gap between the bushing 18 and the stator body 25 can be filled with thermally conducting filler 23. This allows dissipating heat from the bushing 18 to the stator body 25.

Figure 3:
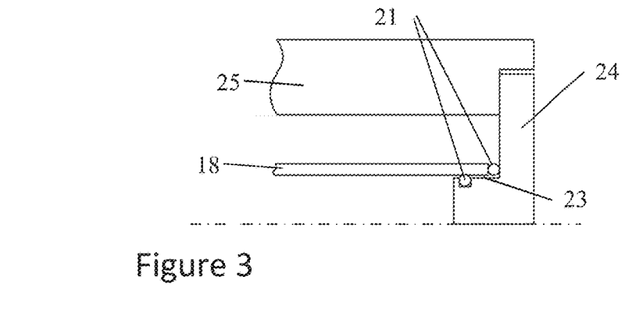
FIG. 3 an alternative elastic suspension of one end of a bushing of the first embodiment.

In the embodiment of FIG. 2, the first elastic supports 21 and the conducting filler 23 are arranged at the outside of the peripheral surface of the bushing 18. FIG. 3 schematically shows an alternative arrangement of these elements: here the stator body 25 includes or carries an end piece 24. The end piece 24 projects into the inside of the bushing 18. At least one first elastic support 21 and optionally the conducting filler 23 are arranged on the inside of the bushing 18 between the bushing 18 and the end piece 24.

Figure 4:
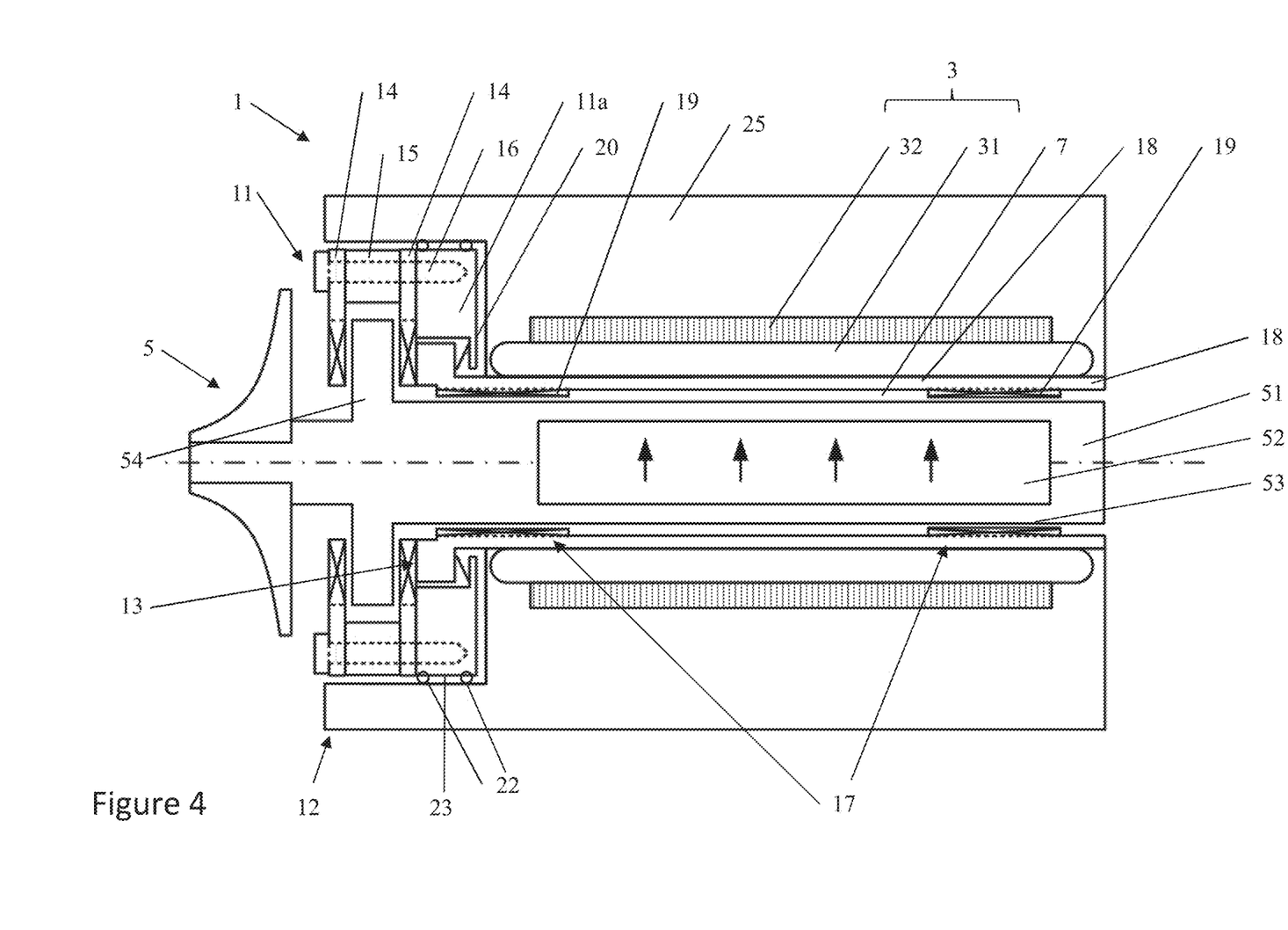
FIG. 4 a second embodiment of an electrical machine.

FIG. 4 schematically shows a second embodiment, with the elements already mentioned, but in a different arrangement. Again the axial bearing assembly 11 and the bushing 18 are in contact at the axial reference surfaces 13. However, in this case it is not the axial bearing assembly 11 but rather the bushing 18 that is attached to the stator body 25 in a fixed manner. The axial bearing assembly 11 can be linked to the stator body 25 by means of optional second elastic supports 22, for example, O-rings. Optionally, thermally conducting filler 23 is arranged in a gap between the second elastic supports 22. If the bushing 18 and axial bearing assembly 11 are not joined by other means, the axial compensation element 20, such as a plate spring, can be arranged to press the bushing 18 in the axial direction away from a projection 11a of the axial bearing assembly 11 against the stator disc 14. Alternatively, the arrangement of FIG. 2c can be implemented in combination with the remaining elements of FIG. 4.

The embodiment of FIG. 4 can be implemented in combination with a carrier 4 for the electrical stator 3, supported by elastic carrier supports 41, as in FIG. 2. In this case, the bushing 18 can be rigidly attached to the stator body 25, with the carrier 4 and electrical stator 3 remaining movable relative to the bushing 18, or the bushing 18 can be rigidly attached to the carrier 4 and thereby be in a fixed position relative to the electrical stator 3.

In both cases, i.e. the bushing 18 being attached to the stator body 25 or the electrical stator 3, the bushing 18 can be mounted by means embedding it, in particular with a thermally conductive molding material to obtain improved thermal coupling to the stator.

For the embodiments of both FIG. 2 and FIG. 4, the following holds:

The bushing 18 lies within the magnetic (air) gap that separates the electrical stator 3 and the rotor 5. Furthermore, the bearing elements 19 and cooperating rotor bearing surfaces 53 of the radial bearing section 17 lie completely or mostly within the volume through which the magnetic flux driving the motor passes.

The bearing air gap 7 lies between the bushing 18 and the rotor 5. It is narrowest at the location of the bearing elements 19 and cooperating rotor bearing surfaces 53, and can be wider at other locations in the axial direction in order to reduce friction losses.

The position of the bushing 18 relative to the axial bearing assembly 11 is rigidly constrained by only one mechanical link. This link is defined by the axial reference surfaces 13 on the bushing 18 and one of the stator discs 14. During assembly, these surfaces can slide on one another. Afterwards, they are pressed together by the axial compensation element axial compensation element 20 and are in essence rigidly connected. The only other mechanical links between the bushing 18 and the axial bearing assembly 11—via the stator body 25—are elastic or resilient since they run via the axial compensation element 20 and the optional first elastic supports 21 (FIGS. 2 and 3).

via the optional second elastic supports 22 (FIG. 4)

In this way, the relative position of these parts and in particular of the bushing 18 with respect to the stator discs 14 is not overdetermined. Thus, the precision of the alignment of the axial and radial bearing sections is easy to achieve, by precise machining of the axial reference surfaces 13, and can be maintained under thermal and mechanical stress.

In other words, the axial bearing assembly 11 and bushing 18—together forming the stator bearing structure—and the rotor 5 can part of one or more kinematic loops, where each loop includes at least one resilient element. Conversely, the axial bearing assembly 11 and bushing 18 are not part of an overconstrained loop or arrangement.

Furthermore, the location of the bushing 18, and thus the axis of rotation, is constrained by the location of the stator body 25 in a fixed manner by not more than one mechanical link, that is via the attachment of the axial bearing assembly 11 to the stator body 25 (FIGS. 2 and 3).

via the attachment of the bushing 18 to the stator body 25 (FIG. 4).

Figure 5:
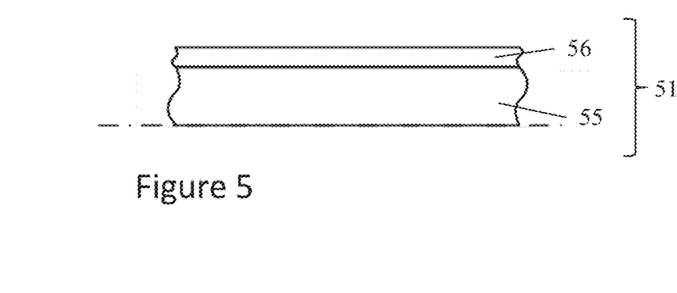
FIG. 5 a partial longitudinal section of a rotor with a layer of compensation material.

FIG. 5 schematically shows a partial longitudinal section of a rotor 5 according to the prior art. The rotor 5 includes a rotor core 55 inside a rotor sleeve 56.

Figure 6A:
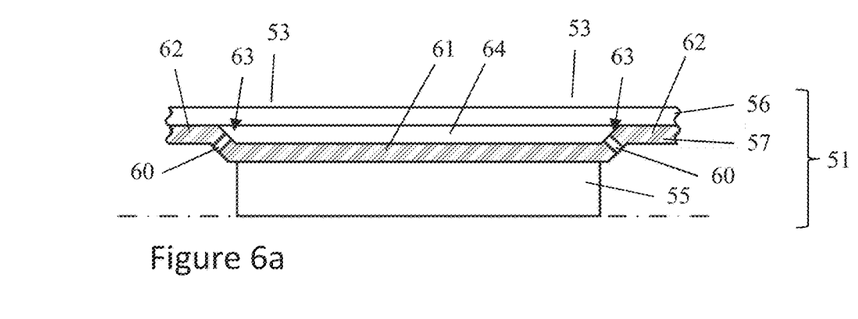
Figure 6B:
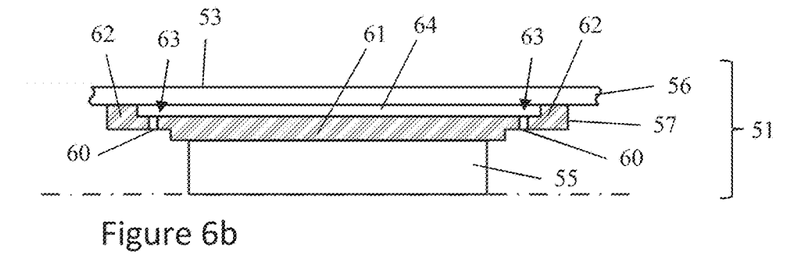
Figure 6C:
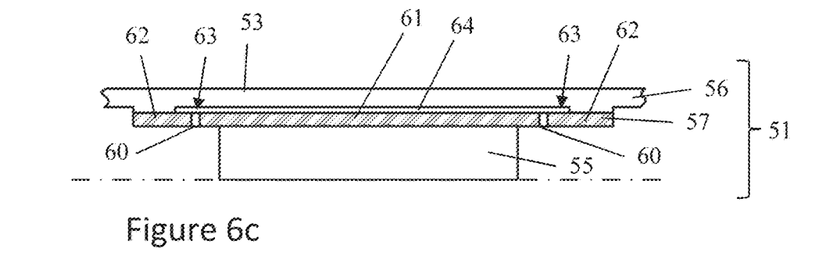

FIGS. 6a through 6c schematically show embodiments with a mechanically resilient decoupling of the rotor core 55 from the rotor sleeve 56 by means of a compensation element 57. The compensation element 57 absorbs differences in thermal expansion and allows to combine a rotor sleeve 56 with a relatively low coefficient of thermal expansion (CTE) with a rotor core 55 with a relatively high CTE.

The compensation element 57 can be made of a metal such as titanium or a titanium alloy, steel, a nickel alloy. Alternatively, it can be made of a synthetic material such as PEEK (Polyetheretherketone), PAI (Polyamide-imide, e.g. trademarked as Torlon), etc.

The compensation element 57 includes first sections 61 in contact with only the rotor core 55 and not the rotor sleeve 56, and second sections 62 in contact with only the rotor sleeve 56 and not the rotor core 55, and compensating sections 63 linking the first and second sections. Typically, there is a tight fit or pressure fit at the first sections 61 and/or at the second sections 62. Alternatively or in addition, they may be glued. A hollow space 64 lies between the rotor sleeve 56 and the compensation element 57. The hollow space 64 is ventilated by ventilation openings 60.

In the embodiments of FIGS. 6a and 6b, the second sections 62 are flanges at the two ends of the compensation element 57, where the compensation element 57 has an enlarged diameter relative to the first section 61. The embodiment of FIG. 6a can be manufactured by a forming process. The embodiment of FIG. 6b can be manufactured by a machining or cutting process. In the embodiment of FIG. 6c, the compensation element 57 including the second sections 62 is of a substantially cylindrical shape, without flanges having an enlarged diameter. Instead, the rotor sleeve 56 at the two ends of the compensation element 57 has inwardly protruding elements that are in contact with the second sections 62. At locations without such protruding elements, the hollow space 64 is arranged between the rotor core 55 and the rotor sleeve 56.

FIGS. 7a through 7g schematically show embodiments with second sections that form a support section for the rotor sleeve 56. Such support sections can be provided at one or more locations in one of the arrangement of FIGS. 6a to 6c, or embodiments in which the rotor sleeve 56 is not supported at its ends.

Figure 7A:
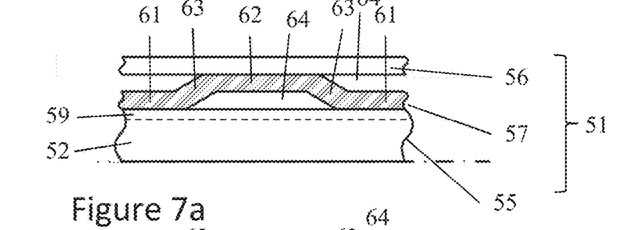

The support sections can be realised as a plurality of separate projections or bumps shaped in the compensation element 57, or as one or more projecting ribs extending along at least part of the rotor core 55 (FIG. 7a).

Figure 7B:
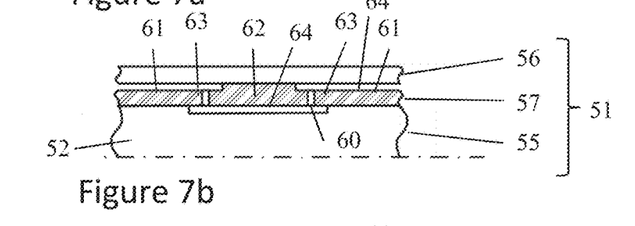
Figure 7C:
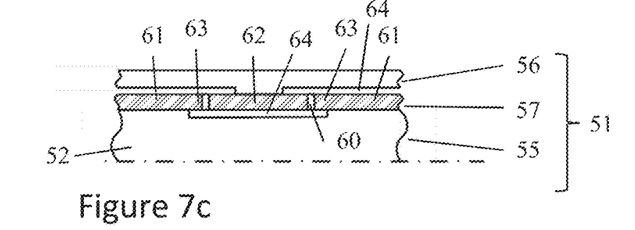
Figure 7D:
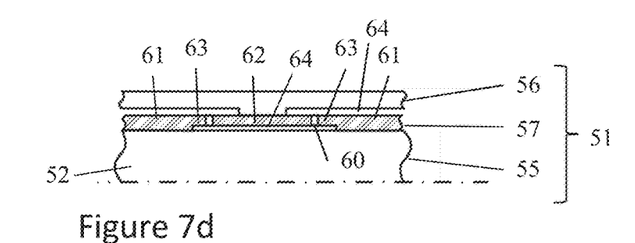

The support sections can establish a distance corresponding to a hollow space 64 between the rotor sleeve 56 and the compensation element 57 by an outwardly projecting element of the compensation element 57 (FIG. 7b) and/or an inwardly projecting element of the rotor sleeve 56 (FIGS. 7c and 7d).

The support sections can establish a distance corresponding to a hollow space 64 between the compensation element 57 and the rotor core 55 by a cavity in the rotor core 55 (FIG. 7c) and/or a cavity in the compensation element 57 (FIG. 7d).

Whereas FIGS. 7b through 7d show support sections with projections between the rotor sleeve 56 and the compensation element 57 and cavities between the compensation element 57 and the rotor core 55, other embodiments have cavities between the rotor sleeve 56 and the compensation element 57 and projections between the compensation element 57 and the rotor core 55.

Figure 7E:
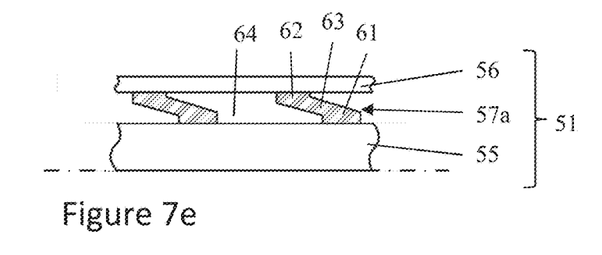
Figure 7F:
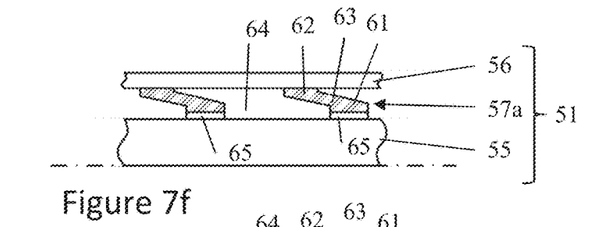

FIGS. 7e through 7h schematically show arrangements in which the compensation element 57 includes several separate parts or compensation parts 57a arranged between the rotor core 55 and the rotor sleeve 56. Each of these separate compensation parts 57a can correspond to one support section. The compensation parts 57a of FIGS. 7e through 7g can be manufactured by molding, in particular injection molding. They can be manufactured from a synthetic material or from a metal material. The compensation parts 57a can be ring shaped, i.e. extend in a circular fashion around the rotor core 55. They can be molded seperately and then slid onto the rotor core 55, or they can be molded in place on the rotor core 55. This can result in the compensation parts 57a being stressed. Such stress can be mitigated by incorporating reinforcement rings 65 made, for example, of a metal, in particular titanium or steel, on the inside of the compensation parts 57a where they contact the rotor core 55. This is shown in FIG. 7f.

FIG. 7e shows ring-shaped compensation parts 57a that can be manufactured with a simple two-part mold without undercuts, with the molds moving in the axial direction for removing the part after molding. As seen in the longitudinal cross section, the ring shape extends in the axial direction with an outer diameter that increases monotonously from the first section 61 to the second section 62, and the outer diameter also increases monotonously from the first section 61 to the second section 62.

Figures 7G, 7H:
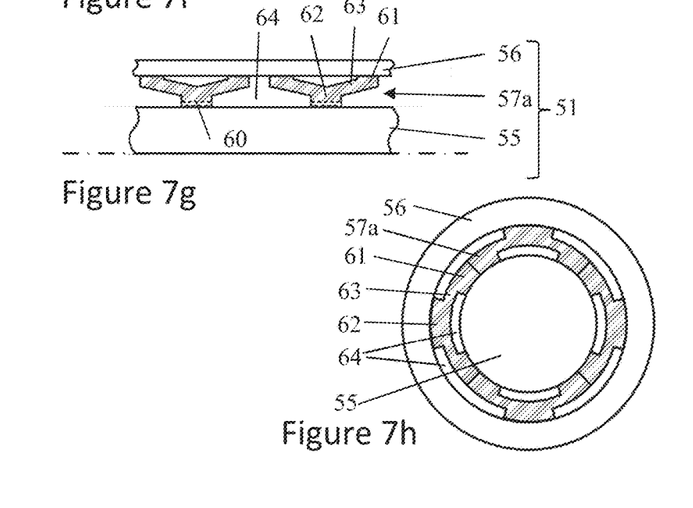

FIG. 7g shows compensation parts 57a with a Y-shaped cross section. X-shaped compensation parts 57a are also possible. FIG. 7h shows separate compensation parts 57a seen in the axial direction. The compensation parts 57a abut one another in the circumferential direction. Thereby they can provide good centering of the rotor sleeve 56 on the rotor core 55. The compensation parts 57a can be manufactured by extrusion or by (injection) molding. The compensation parts 57a can extend in the axial direction, i.e. with the cross section of FIG. 7h remaining unchanged at different points along the axis. Alternatively, the compensation parts 57a can be arranged in a helix configuration. In other embodiments, not shown, the compensation parts 57a are not separate but are manufactured as a single piece.

In further embodiments, not shown, projections and cavities are arranged on the rotor sleeve 56 and/or the rotor core 55 and/or the compensation element 57 and running in the axial direction, in analogy to the embodiments of FIGS. 7b through 7d where they run in the circumferential direction.

In each embodiment corresponding to FIGS. 6a through 6c and 7a through 7h the ribs or compensation parts 57a or, in general, the support sections can be separate from one another, and/or extend in one direction following a linear or circular or spiral trajectory. In each case, a hollow space 64 lies between the compensation element 57 and the rotor core 55 and/or between the compensation element 57 and the rotor sleeve 56. In each case, ventilation openings ventilation opening 60 (not drawn in each case) can be present as well.

For all embodiments including features of FIGS. 6a through 6c and 7a through 7h it is the case that the rotor core 55 and rotor sleeve 56 are radially decoupled. In other words, each line in the radial direction which passes through the rotor core 55 and the rotor sleeve 56 passes, in between the rotor core 55 and the rotor sleeve 56, at least once through a hollow space 64.

FIG. 7a also schematically shows an optional variant in which the rotor core 55 includes not solely the permanent magnet but the permanent magnet 52 arranged in a sheath 59 in order to maintain mechanical stability at high speeds. This variant can be combined with the embodiments of the other figures.

Figure 8:
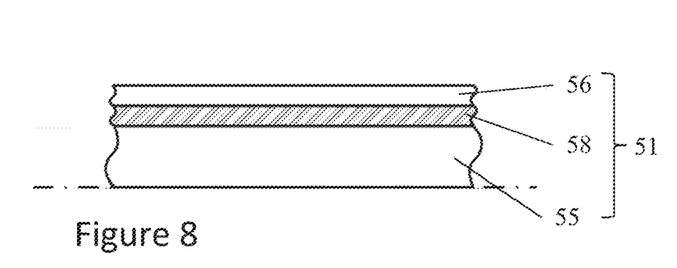
FIG. 8 a partial longitudinal section of a rotor with a layer of compensation material.

FIG. 8 schematically shows a decoupling by means of a layer of compensation material 58. This can be an adhesive or filling material which accommodates the different CTE's of the rotor core 55 and rotor sleeve 56, and thereby relieves corresponding stress.

The compensation material 58 can be silicone, to which filling materials can be added in order to determine its Young's modulus to a desired value. Such values can be 5 to 50 MPa. Filling materials can be ceramic particles with sizes of less than 50 micrometers. Unfilled silicone can have values around 1 MPa or 2 MPa to 4 MPa.

Figure 9:
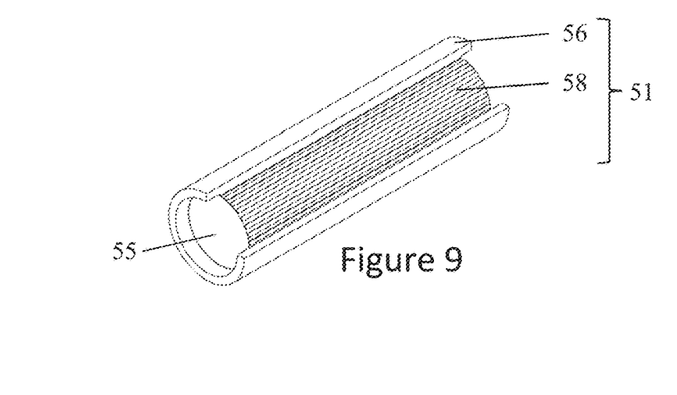
FIGS. 9-13 rotors with structured stress relieving adhesives or filling materials.

FIG. 9 shows a rotor construction with a structured stress relieving adhesive and/or filling as a compensation material 58. Grooves in the compensation material 58 provide pockets of air and increase the compressibility of the body of the compensation material 58 as a whole, as opposed to the situation where the entire volume between the rotor core 55 and the rotor sleeve 56 is filled with the compensation material 58. The grooves are shown to run in the axial direction. With grooves running circumferentially, and with the grooves extending all the way from the rotor core 55 to the rotor sleeve 57, the embodiment corresponds to that of FIG. 13.

Figure 10:
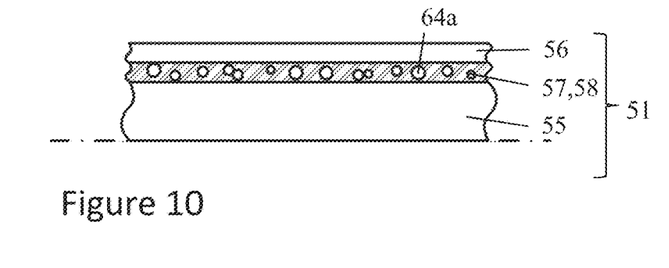

FIG. 10 shows rotor a construction with an elastic compensation material 58 including gas bubbles. Such gas bubbles can be formed, for example, by means of a foaming additive or by means of (thermally) expandable hollow microspheres 64a. The wall thickness of such microspheres typically is so small that their mechanical behaviour is like that of gas bubbles. Here the gas bubbles or microspheres have diameters that are smaller than the distance between the rotor core 55 and the compensation element 57.

Figure 11:
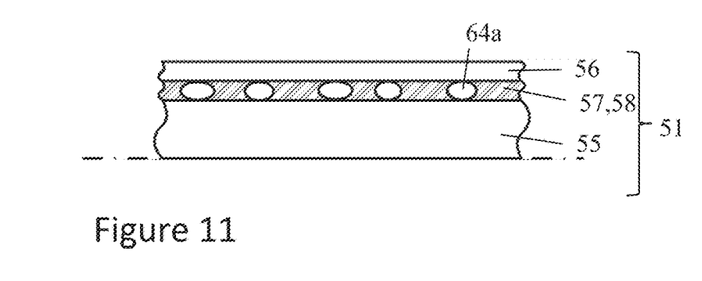

FIG. 11 shows a rotor construction with an elastic compensation material 58 including expandable hollow microspheres 64a with a nominal diameter after expansion that is larger than the distance between the rotor core 55 and the compensation element 57. This causes the rotor core 55 and the compensation element 57 to be automatically aligned and centered when the microspheres 64a expand.

Figure 12:
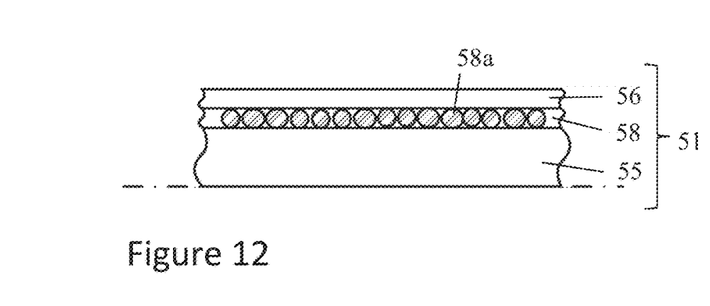

FIG. 12 shows a rotor construction with compensation spheres 58a of an elastic material, arranged and thereby elastically deformed between the rotor core 55 and the rotor sleeve 56. The compensation spheres can be inserted in the gap between the rotor core 55 and rotor sleeve 56 during or after assembly. The ability of the spheres to roll can be blocked by at least one of mechanically enclosing the spheres in the gap, heating them, coating the spheres with an adhesive before or during assembly and hardening or curing the adhesive after assembly. The hardening or curing can be effected by at least one of heat, irradiation, ultrasound, chemical activation, waiting a certain time, etc.

Figure 13:
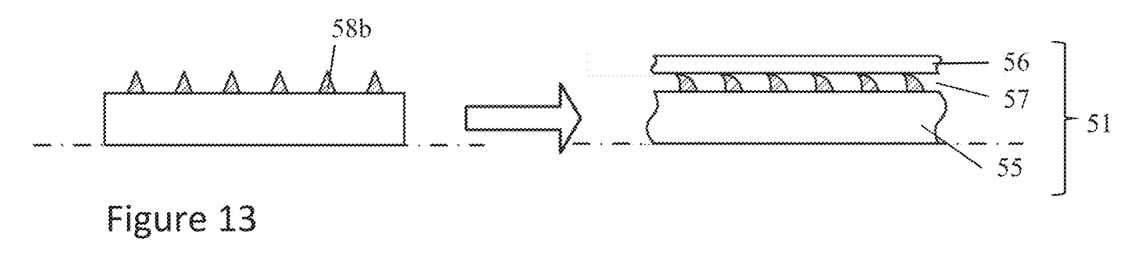

FIG. 13 illustrates an embodiment in which the compensation element 57 includes a plurality of elastic elements 58b attached to the rotor core 55. An outer diameter of the elastic elements 58b is larger than the inner diameter of the rotor sleeve 56. Sliding the rotor sleeve 56 over the rotor core 55 therefore deforms the elastic elements 58b, aligning and centering the rotor core 55.

Figure 14A:
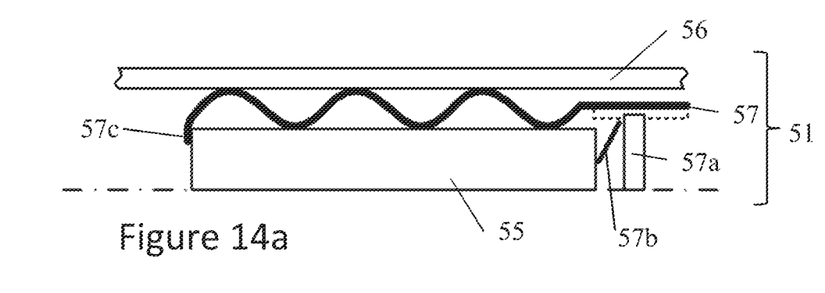
FIGS. 14a-b a rotor with a controllable compensation element.
Figure 14B:
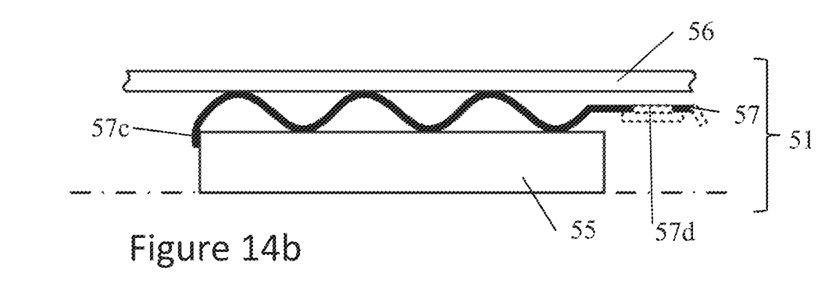

FIGS. 14a-b show a rotor with a controllable compensation element 57. The compensation element 57 has the shape of a corrugated cylinder. Applying a force to the axial ends of the cylinder, pulling them apart, reduces the amplitude of the corrugation. In particular, the outer diameter is reduced, allowing to slide the rotor sleeve 56 over the compensation element 57. In a relaxed state, the outer diameter of the compensation element 57 is larger than the inner diameter of the rotor sleeve 56.

Pulling the ends apart can be done with means that are part of the shaft 51, as shown in FIG. 14a: one end of the compensation element 57 has a hook-like extension 57c that abuts a first end the rotor core 55 and limits movement of the compensation element 57 in one direction along the axis. The other end has elements for pulling the compensation element 57 in that direction by pushing against the other, second end of the rotor core 55. These elements can be a screw 57a engaging threads in the compensation element 57 and pushing against the rotor core 55 via an axially resilient element 57b such as a spring washer or conical spring washer. By turning the screw 57a, the tension force pulling at the compensation element 57 can be adjusted, and thereby the outer diameter of the compensation element 57 as well. After reducing this outer diameter and sliding the rotor sleeve 56 over the compensation element 57, the tension on the compensation element 57 can be reduced and adjusted by unscrewing the screw 57a. The screw 57a can be left at a certain position for setting a radial force between the compensation element 57 and the rotor sleeve 56, or can be removed completely for maximum force.

Thus, pulling the ends apart can be done during assembly only. In the embodiment of FIG. 14b this is done with an attachment element 57d, such as a hole, to which an element (not shown) for pulling at the compensation element 57 can be attached for the purpose of assembly. After assembly, the force acting between the compensation element 57 and the rotor sleeve 56 is a function of the dimensions and material properties of these elements.

The compensation element 57 can be made of a metal, in particular titanium or a titanium alloy, nonmagnetic steel, a nickel alloy, etc. Alternatively, it can be made of a synthetic material or plastic.

The invention claimed is:

1. An electrical machine comprising a stator with a stator body supporting an electrical stator and a rotor,
   the rotor being supported by means of a bearing comprising a radial bearing section forming a radial gas bearing and an axial bearing section forming an axial gas bearing,
   stator side parts of these bearing sections being a stator side radial bearing part and a stator side axial bearing part which are rigidly connected to one another and together form a stator bearing structure,
   characterized in that the stator bearing structure is mounted to other parts of the stator by either:

the stator side radial bearing part being rigidly mounted to the other parts, and the stator side axial bearing part being connected to the other parts by an elastic support or not at all; or the stator side axial bearing part being rigidly mounted to the other parts, and the stator side radial bearing part being connected to the other parts by an elastic support or not at all.

2. The electrical machine of claim 1, wherein the stator bearing structure is attached near one end to the stator body in a fixed manner.

3. The electrical machine of claim 2, wherein the stator side axial bearing part is an axial bearing assembly which is rigidly mounted to the stator body.

4. The electrical machine of claim 1, wherein the stator side radial bearing part is a bushing which is rigidly mounted to the stator body or to a carrier carrying the electrical stator.

5. The electrical machine of claim 1, wherein the electrical machine is of a slotless type.

6. The electrical machine of claim 1,
wherein the radial bearing section extends in a longitudinal direction of an axis of rotation of the rotor and an entirety of the radial bearing section lies in a magnetic gap between the electrical stator and the rotor; or
wherein the radial bearing section extends in the longitudinal direction of the axis of rotation of the rotor and at least one bearing element and a cooperating rotor bearing surface of the radial bearing section lie in the magnetic gap between the electrical stator and the rotor; or
wherein the radial bearing section extends in the longitudinal direction of the axis of rotation of the rotor and at least one quarter, or at least one half, or at least three quarters of the radial bearing section lies in the magnetic gap between the electrical stator and the rotor.

7. The electrical machine of claim 1, wherein the stator side axial bearing part is an axial bearing assembly which is rigidly mounted to the stator body, wherein the stator side radial bearing part is a bushing which is rigidly mounted to the stator body or to a carrier carrying the electrical stator; and wherein a stator disc of the axial bearing assembly and the bushing each comprise an axially facing surface as an axial reference surface and the two axial reference surfaces are placed against one another.

8. The electrical machine of claim 7, wherein the stator disc and the bushing that are placed against one another are pressed against one another by a resilient element.

9. The electrical machine of claim 7, wherein the axial bearing assembly includes two stator discs and a spacer element arranged between the two stator discs, and wherein the two stator discs and the spacer element are pressed against one another by a resilient element.

10. The electrical machine of claim 1, wherein the stator bearing structure, at an end at which it is not rigidly mounted to the other parts, is supported by means of a first elastic support.

11. The electrical machine of claim 10, wherein the stator bearing structure is thermally coupled to the stator body at or near a location of the first elastic support.

* * * * *